United States Patent
Bézy et al.

(10) Patent No.: US 9,092,887 B2
(45) Date of Patent: Jul. 28, 2015

(54) GENERATION OF COMPOSITE SPATIAL REPRESENTATIONS

(75) Inventors: Michel Bézy, Chapel Hill, NC (US); Alan George Cole, Katonah, NY (US); Jonathan Paul Munson, Putnam Valley, NY (US); Stella J. Mitchell, Pleasantville, NY (US); David Alvra Wood, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 736 days.

(21) Appl. No.: 12/570,638

(22) Filed: Sep. 30, 2009

(65) Prior Publication Data

US 2011/0074767 A1    Mar. 31, 2011

(51) Int. Cl.
*G09G 5/00* (2006.01)
*G06T 19/00* (2011.01)
(Continued)

(52) U.S. Cl.
CPC .............. *G06T 19/00* (2013.01); *G06F 3/0484* (2013.01); *G06F 3/0487* (2013.01); *G06F 17/30241* (2013.01); *G06F 17/30994* (2013.01); *G06T 15/30* (2013.01); *G09B 29/106* (2013.01); *G09G 5/14* (2013.01)

(58) Field of Classification Search
CPC .......... G09G 5/14; G06T 15/30; G06T 19/00; G06T 3/0484; G06T 3/04847; G06T 17/30241; G06T 17/30994
USPC ................. 345/629–633, 419–427, 589–592, 345/690–694; 715/764
See application file for complete search history.

(56) References Cited

U.S. PATENT DOCUMENTS

| 5,966,707 A | 10/1999 | Van Huben et al. |
| 6,038,566 A | 3/2000 | Tsai |

(Continued)

FOREIGN PATENT DOCUMENTS

| EP | 0 694 857 | 1/1996 |
| JP | 2004192155 | 7/2004 |

OTHER PUBLICATIONS

J. Arnowitz et al., "Communicating a Task Analysis with Task Layer Maps," Proceedings of the 3rd Conference on Designing Interactive Systems: Processes, Practices, Methods and Techniques, 2000, pp. 346-353.

(Continued)

*Primary Examiner* — Jin-Cheng Wang
(74) *Attorney, Agent, or Firm* — Nidhi Garg; Ryan, Mason & Lewis, LLP

(57) ABSTRACT

Techniques for generating a composite spatial representation are presented. For example, a method includes obtaining a plurality of source spatial representations from a plurality of source applications, and forming the composite spatial representation by combining the plurality of source spatial representations. The composite spatial representation is operative to interact with at least one behavioral element that is separate from the composite spatial representation. The obtaining of the plurality of source spatial representations and the forming of the composite spatial representation are executed on a computing system comprising a processor and a memory. One or more computer program instructions for implementing the obtaining of the plurality of source spatial representations and the forming of the composite spatial representation are obtained from the memory and executed by the processor device.

20 Claims, 8 Drawing Sheets

(51) Int. Cl.
    *G06F 17/30* (2006.01)
    *G06T 15/30* (2011.01)
    *G06F 3/0487* (2013.01)
    *G06F 3/0484* (2013.01)
    *G09G 5/14* (2006.01)
    *G09B 29/10* (2006.01)

(56) References Cited

U.S. PATENT DOCUMENTS

| | | | |
|---|---|---|---|
| 2004/0119759 A1* | 6/2004 | Barros | 345/853 |
| 2006/0174209 A1* | 8/2006 | Barros | 715/764 |
| 2008/0059889 A1* | 3/2008 | Parker et al. | 715/748 |
| 2008/0109760 A1* | 5/2008 | Stambaugh | 715/835 |
| 2008/0109761 A1* | 5/2008 | Stambaugh | 715/853 |
| 2008/0111818 A1* | 5/2008 | Stambaugh | 345/440 |
| 2008/0129725 A1* | 6/2008 | Stambaugh | 345/419 |
| 2008/0150963 A1* | 6/2008 | Stambaugh | 345/629 |
| 2008/0172632 A1* | 7/2008 | Stambaugh | 715/781 |
| 2009/0027418 A1* | 1/2009 | Maru et al. | 345/629 |
| 2009/0138826 A1* | 5/2009 | Barros | 715/841 |
| 2009/0172511 A1* | 7/2009 | Decherd et al. | 715/207 |
| 2009/0299990 A1* | 12/2009 | Setlur et al. | 707/5 |
| 2009/0300528 A1* | 12/2009 | Stambaugh | 715/764 |
| 2010/0017733 A1* | 1/2010 | Barros | 715/766 |

OTHER PUBLICATIONS

Ben Schneiderman, "Promoting Universal Usability with Multi-Layer Interface Design," ACM Conference on Universal Usability, Nov. 2003, pp. 1-8.

D. Lorenzoli et al., "Designing Multi-Layers Self-Adaptive Complex Applications," Fourth International Workshop on Software Quality Assurance, Sep. 2007, pp. 70-77.

* cited by examiner

| | | Map Layer Event Types |
|---|---|---|
| *Event name* | *Elements* | *When generated* |
| onclick | Feature | When element is mouse-clicked or finger-tapped |
| onmouseover | Feature | When mouse is held over element. (Not generated in pointerless environments such as iPhone.) |
| onchange | Featureset | When a Featureset element is updated through refresh. This event is not generated when Featureset elements are updated through DOM functions. |
| onload | document | When the layer document is first loaded |
| onreload | document | When the layer document is reloaded as the result of a refresh attribute or an explicit reload. |

FIG. 4
400

SPATIAL FUNCTIONS

| Function | Description |
|---|---|
| distance(F, F) | Returns the distance between the two (point) features, or if one feature is a linestring, returns the shortest distance from the point to the linestring. For geometries in a spherical coordinate system, geodesic distance is used. |
| nearest(F, FS, d) | Returns the feature in featureset FS that is closest to feature F. A distance function $d$ may be supplied; if null, the distance function above is used. |
| nearest(FS1, FS2, d) | Of all possible pairings of points in FS1 with points in FS2, returns the the pair that are nearest each other. A distance function $d$ may be supplied; if null, the distance function above is used. |
| assign(FS1, FS2, d) | Returns an assignment of each feature in featureset FS1 to a feature in FS2 that minimizes the sum of the distances. A distance function $d$ may be supplied; if null, the distance function above is used. |
| intersection(F, F) | Returns the intersection, as a geometry, between the two given features. |
| intersection(F, FS) | Returns the intersection, as a set of geometries, between feature F and featureset FS. |
| intersection(FS, FS) | Returns the intersection, as a set of geometries, between feature F and featureset FS. |
| invoke(F, fcn) | Invokes the function "fcn" on the geometry defined by feature F. Examples include "search," "buddy locator," "weather report," and "traffic report." Returns a featureset. |

*FIG. 4 cont.*
400

| | |
|---|---|
| central(FS, FS, d) | Given a set of point features, finds the point that minimizes the sum of the distances from each point in the featureset to that point. If the second FS argument is not null, the point returned is one in that set; if null, a new point is calculated and returned. A distance function $d$ may be supplied; if null, the distance function above is used. |
| shortestPath(F, F, d) | Returns the shortest path between two point features. A distance function $d$ may be supplied; if null, the distance function above is used. |
| contains(Fpt, Fpo) | Returns true iff point feature Fpt is contained in polygon feature Fpo. |
| contains(Fpt, FS, l) | Returns true iff point feature Fpt is contained in any of the polygon features in FS, and returns the list of such polygons in $l$. |
| bounds(FS) | Returns the bounding box that contains all features in FS. |
| convexHull(FS) | Returns the convex polygon that contains all features in FS. |
| length(Fl, u) | Returns the length of linestring feature Fl in the given units $u$. |
| area(Fpo, u) | Returns the area of polygon feature Fpo in the given units $u$. |
| perimeter(Fpo u) | Returns the perimeter of polygon feature Fpo in the given units $u$. |

FIG. 5
500

SPATIOTEMPORAL FUNCTIONS

| Function | Description |
|---|---|
| collision(F, F, r) | Returns the number of seconds before a collision between two bodies, assuming the velocity of each body does not change. |
| entered(Fpt, Fpo) | Returns true when point feature Fpt has entered polygon feature Fpo. |
| exited(Fpt, Fpo) | Returns true when point feature Fpt has exited polygon feature Fpo. |
| crossed(Fpt, Fl, d) | Returns true when point Feature Fpt has crossed linestring feature Fl. A crossing direction $d$ may be specified. |
| ETA(F, F, r) | Returns the estimated time of arrival of the first point feature at the second point feature, using routing function $r$. If $r$ is null, a geodesic route is calculated. |
| onRoute(F, Fl, d,) | Returns true iff the point feature F lies on the linestring feature Fl, within the tolerance d. |
| onSchedule(F, Fs, d, t) | Returns true iff the point feature F lies on the schedule feature Fs, within the distance tolerance $d$ and the time tolerance $t$. A schedule feature is a linestring feature with a "schedule" attribute, which is a list of timestamps, one for each point in the linestring. |
| moved(F, d) | Returns true iff the point feature F has moved at least distance d since the last invocation. |

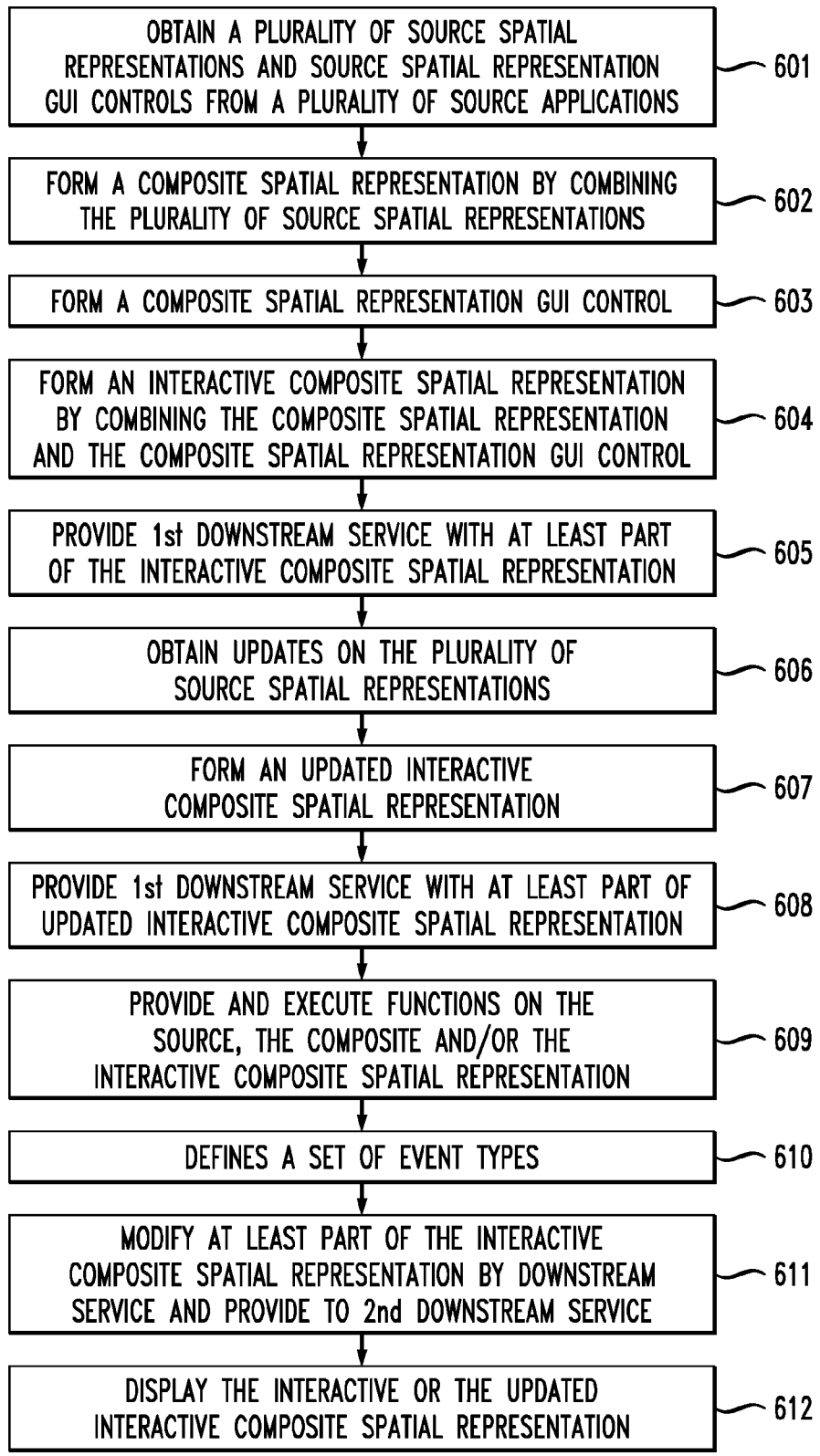

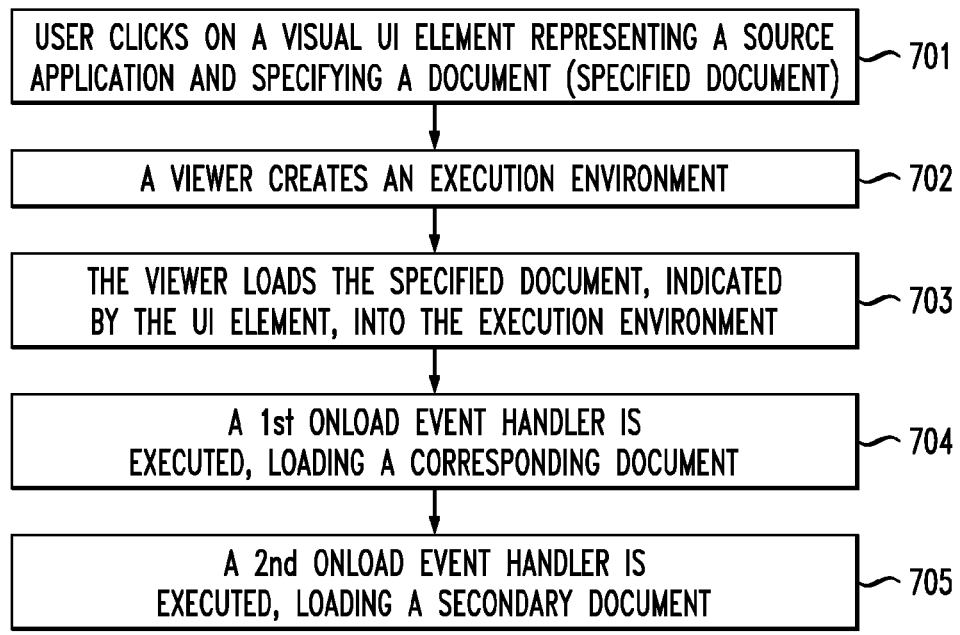
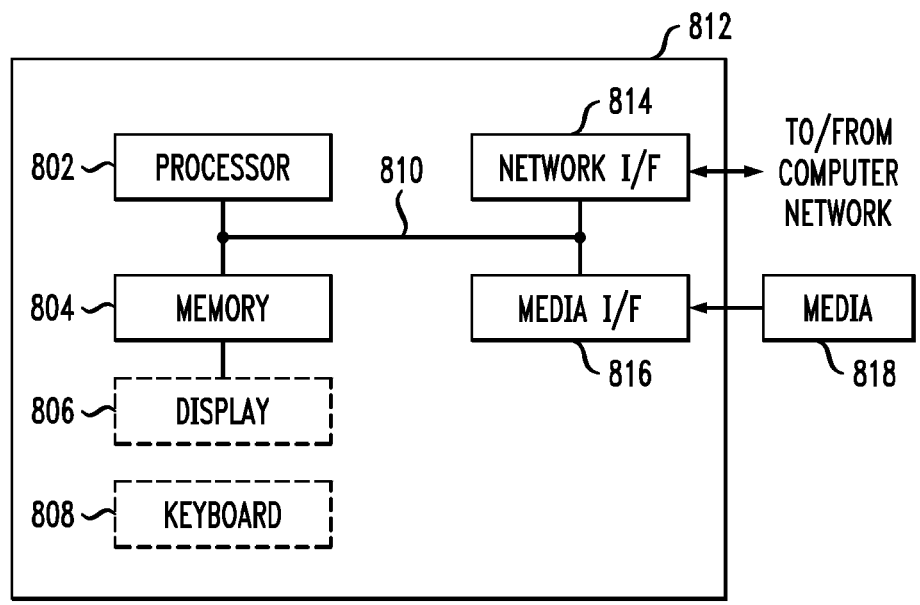

GENERATION OF COMPOSITE SPATIAL REPRESENTATIONS

FIELD OF THE INVENTION

The present invention relates generally to spatial representations and, more particularly, to techniques for combining a plurality of source spatial representations to form a composite spatial representation.

BACKGROUND OF THE INVENTION

Internet technology offers application developers a combination of declarative and programmatic elements for use in developing applications. Internet application developers use declarative elements such as hyper-text markup language (HTML) and cascading style sheets (CSS) in documents that provide structure, content and decoration, and programmatic elements such as JavaScript functions to provide computational and interactive behavior based on the documents. This technology has provided applications that are both browser-deployable and responsive. The term "browser" is intended to mean not only an Internet browser but any universal user-interface program, i.e., a program that loads and renders a document-based graphical user interface (GUI) of an application, handles user interaction with the GUI, and is capable of loading GUI definitions from local or remote sources.

Electronic maps are an important medium for many interactive applications. Many map-based applications are not browser-deployable or are limited to a narrow range of interactive behavior. Some map toolkits offer browser-deployable application GUIs with an expanded range of interactive behavior. However, these map toolkits are known to restrict the composition ability of developers.

SUMMARY OF THE INVENTION

Principles of the invention provide, for example, techniques for generating composite spatial representations associated with spatially oriented applications.

For example, in accordance with one embodiment of the invention, a method for generating a composite spatial representation is provided. The method includes obtaining a plurality of source spatial representations from a plurality of source applications, and forming the composite spatial representation by combining the plurality of source spatial representations. The composite spatial representation is operative to interact with at least one behavioral element that is separate from the composite spatial representation. The obtaining of the plurality of source spatial representations and the forming of the composite spatial representation are executed on a computing system comprising a processor and a memory. One or more computer program instructions for implementing the obtaining of the plurality of source spatial representations and the forming of the composite spatial representation are obtained from the memory and executed by the processor device.

Advantageously, illustrative embodiments of the invention provide, for example, techniques for obtaining, combining and simultaneously displaying multiple map layers, and for providing and executing behavioral elements, e.g., scripts, that are separate from structure, content, and decoration of the map layers. The structure, content and decoration can be operated on by the behavioral elements to enable a variety of interactive or computational behaviors. Aspects of the invention enable, for example, operations that combine multiple dynamic or static feeds of data from multiple sources in various ways. The data coming from the multiple feeds are combined before being displayed. In another example, aspects of the invention enable end users to visualize relationships between dynamic spatial datasets and create custom alerts on changes in the datasets. Features of the invention also enable, for example, collaboration, social networking, geographic information systems and emergency response.

Such embodiments of the invention provide an improvement over the above-mentioned map toolkits in that the known map toolkits do not fully separate structure, content, and decoration elements from behavioral elements. Therefore, the known map toolkits restrict the ability of developers to compose map-based GUIs with other document-oriented programming technologies such as extensible style-sheet language transformations (XSLT). Embodiments of the invention solve these and other problems of the existing art.

These and other features, objects and advantages of the present invention will become apparent from the following detailed description of illustrative embodiments thereof, which is to be read in connection with the accompanying drawings.

BRIEF DESCRIPTION OF THE DRAWINGS

FIG. 3 shows a map layer event table listing the exemplary event types that can be generated on map layer elements, according to an exemplary embodiment of the invention.

FIG. 4 shows a spatial functions table listing functions that are spatial in nature, according to an exemplary embodiment of the invention.

FIG. 5 shows a spatio-temporal table listing functions that take into account the change in geometrical relationships over time, according to an exemplary embodiment of the invention.

FIG. 6 illustrates a method of generating a composite spatial representation, according to an exemplary embodiment of the invention.

FIG. 7 illustrates a method for obtaining a plurality of source spatial representations and source spatial representation user graphical interface control, and for executing source applications comprising the plurality of source spatial representations, according to an exemplary embodiment of the invention.

FIG. 8 depicts a computer system that may be useful in implementing one or more aspects and/or elements of the invention.

DETAILED DESCRIPTION OF THE INVENTION

Figure 1:
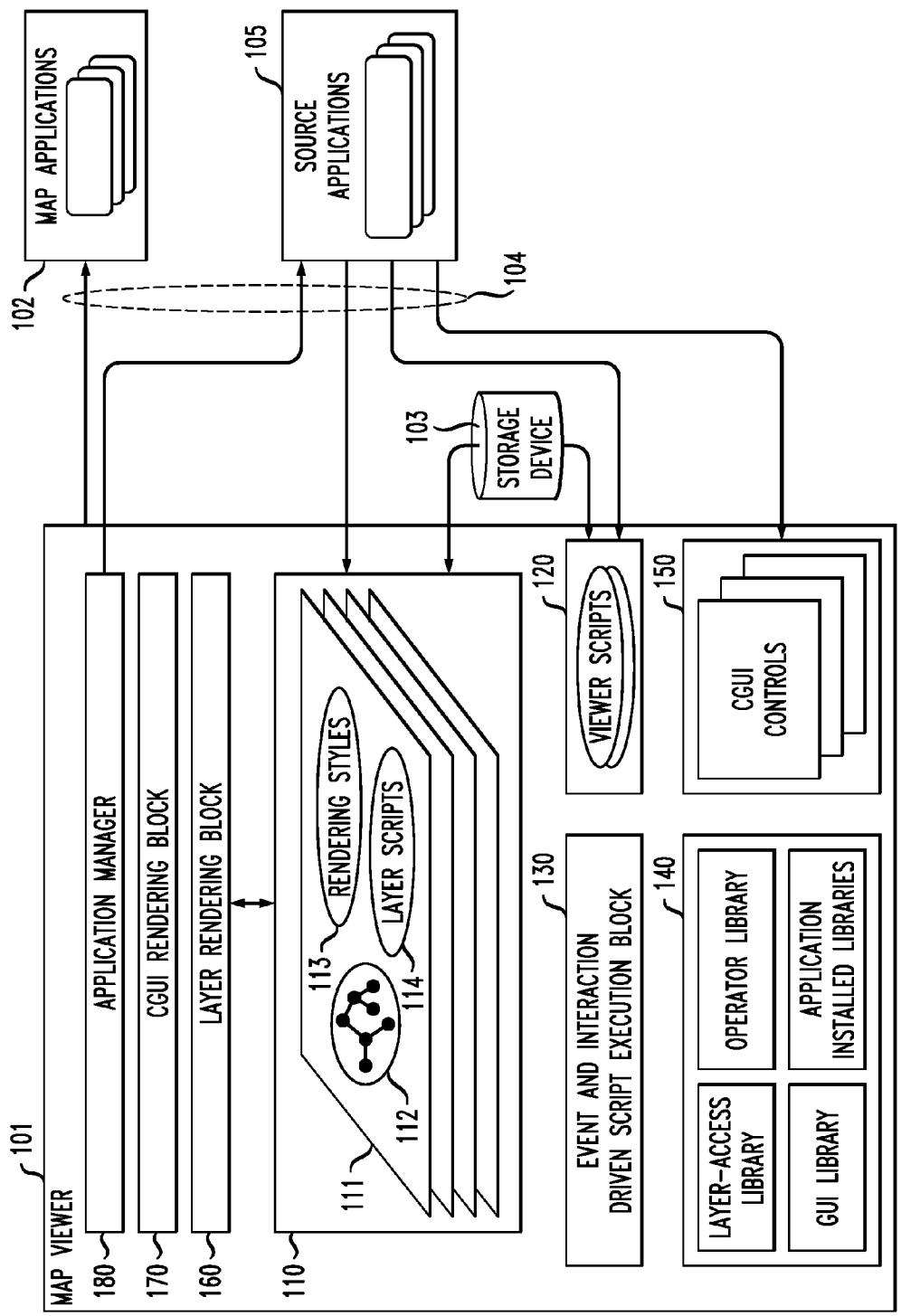
FIG. 1 illustrates an exemplary architecture, comprising a map viewer, according to an exemplary embodiment of the invention.

As used illustratively herein, a client is an application and/or system that accesses, typically over a network, a remote service on a computer system, for example, on a remote server. For example, a client may comprise software, resident on a processor device (e.g., a processor coupled to a memory), that obtains or downloads multiple first datasets (e.g., each first dataset comprising a map layer). Additionally, a client may perform processing and provide functions, for example, processing of the first datasets to form a second dataset and provide the second dataset to a user or to another client. A client may additionally comprise hardware (e.g., the processor device) or may comprise hardware only.

As used illustratively herein, a a graphical user interface (GUI) is a type of user interface which allows people to interact with electronic devices such as computers, hand-held devices (e.g., MP3 Players, Portable Media Players, gaming devices, and cell phones), household appliances and office equipment. A GUI, for example, offers mostly graphical icons, and visual indicators, as opposed to mostly typed commands or text navigation, to represent the information and actions available to a user. The interactions are usually performed through direct manipulation of the graphical icons or graphical elements.

As used illustratively herein, a conventional graphical user interface (CGUI) is a type of GUI that provides conventional GUI applications, for example windows and window controls (e.g., buttons, check-boxes, menus, input boxes, etc.). CGUI is supported by a library that provides a set of functions (e.g., C-language based functions) to create GUI applications.

As used illustratively herein, the term spatial representation is a representation that comprises a location-dependency, a geographic position, a geographically-defined shape, and/or a geometric positioning in a linear or multi-dimensional space. By way of example only, a spatial representation could be an electronic form of a geographic map, a geometric map, a street map, a terrain map, a planetarium visual display of planets and stars, a physical layout or plan such as a building floor-plan, or a display of location of objects such as a traffic pattern.

As used illustratively herein, a document object model (DOM) is a platform-independent and language-independent standard object model for representing HTML or extensible markup language (XML) and related formats.

As used illustratively herein, an application programming interface (API) is a set of functions, procedures, methods, classes or protocols that an operating system, library or service provides to support requests made by computer programs.

As used illustratively herein, a cascading style sheets (CSS) is a style-sheet language used to describe the presentation of a document written in a markup language. A common application is to style web pages written in HTML, but the language can be applied to other kinds of XML documents.

As used illustratively herein, an extensible style sheet language transformation (XSLT) is an XML-based language used for the transformation of XML documents into other XML or human-readable documents. The original document is not changed, rather, a new document is created based on the content of an existing document. The new document may be serialized or output by a processor in standard XML syntax or in another format, such as HTML or plain text. XSLT is often used to convert data between different schemas, or to convert XML data into HTML or XHTML documents for web pages, creating a dynamic web page, or into an intermediate XML format that can be converted to portable document format (PDF) documents.

As used illustratively herein, a behavioral elements are elements that cause a behavior, presentation, execution, operation, or flow, for example, an element that causes a change in a map or other spatial representation or the display thereof. By way of example only, behavioral elements are often software, software scripts or functions. Software elements may be triggered by events, for example, computer mouse pointer indications or keystrokes.

An aspect of the invention is behavioral elements that are separate from what the behavioral elements may affect, operate on or interact with, for example, separate from data, maps or spatial representations that the behavioral elements may affect, operate on or interact with. In the case where the behavioral elements interact with data, the behavioral elements may be considered separate from the data in that, for example, the data may be complete and useful without the behavioral elements. For example, the data may be usefully presented in some way without the behavioral elements. This does not preclude the data from requiring other behavioral elements (alternate behavioral elements) to be useful or complete. The behavioral elements that are separate, however, may add value or usefulness to the data not previously available even with the alternate behavioral elements. Furthermore, the data may be stored and operated upon without the behavioral elements that are separate.

As more and more technology involves spatial awareness, e.g., mobile phones and global positioning systems, the value of being able to portray spatial quantities is increasingly important. Spatial quantities may be displayed by the superposition of multiple layers comprising spatial or spatio-temporal information, for example, the superposition of map layers. Illustrative embodiments of the invention relate to obtaining, combining and displaying of multiple map layers. For example, such embodiments enable operations that combine multiple dynamic or static feeds of data from multiple sources in various ways. The data coming from the multiple feeds may be combined before being displayed. By way of another example, such embodiments enable end users to visualize relationships between dynamic spatial datasets and create custom alerts on changes in the datasets. Further, such embodiments enable, for example, collaboration, social networking, geographic information systems and emergency response.

Still further, illustrative embodiments of the invention enable map layers to be rendered by a map viewer as interactive documents, analogous to Web browsers rendering Web pages. A map layer has structure, content, and decoration that can be operated on by behavioral elements, such as software scripts, to enable a variety of interactive or computational behaviors. A map layer may represent a central element of a GUI of an application. The application may be a single-user or multi-user application, a local or network application, or an application displaying static or dynamic content. Scripts may be embedded in map-layer documents or may be loaded and executed independently of map layer documents. Scripts may call spatial and temporal operators in a library provided by the map viewer. With appropriate security-related restrictions, scripts may access the data in the map layers of other applications. This makes possible an entirely new class of lightweight spatio-temporal intelligence applications. For example, a map layer from one application showing the continuously updated locations of emergency vehicles, a map layer from another application showing the locations of incidents, and a map layer from a third application showing roadway congestion, can be correlated through a script to reveal which emergency vehicle should respond to which incident, given current traffic conditions. This approach is advantageous for two reasons: (1) it integrates the power of visualization with the power of computation, and (2) it offers an infrastructure-less approach that requires no servers to be purchased, installed, and maintained.

An embodiment of the invention treats or considers objects of spatially oriented applications (e.g., maps objects) as first-class user interface (UI) entities, providing the objects with a document object model (DOM) enabling, for example, the behavioral elements to act on or interact with the map or spatially oriented application objects. In this way, the behavioral elements may be separate from the structure, content and decoration of the map or spatially oriented application and enabled to interact with the map or spatially oriented application. This embodiment of the invention provides advantage over an object-oriented, API-based approach where map objects are accessible only to the program that instantiates the map object. The object-oriented, API-based approach inhibits separation of the behavioral element from the structure, content and decoration because other programs cannot access the map or object oriented application objects.

Another embodiment of the invention comprises a spatially oriented application, comprising a composite spatial representation, configured for a user to indicate a source application comprising at least one of a plurality of source spatial representations. The spatially oriented application is configured for loading and executing the source application.

FIG. 1 illustrates exemplary architecture 100 of the invention according to an embodiment of the invention. The exemplary architecture 100 comprises a map viewer 101 and a storage device 103, for example, a local storage device located in the proximity of the map viewer 101 and/or closely coupled to the map viewer 101.

Map viewer 101 comprises map layer block 110, viewer scripts 120, an event and interaction driven script execution block 130, library 140, CGUI controls 150, layer rendering block 160, CGUI rendering block 170, and application manager 180.

Each map layer 111, within the map layer block 110, comprises spatial data 112, rendering styles 113 and, optionally, layer scripts 114. Spatial data 112 comprises, for example, a collection of logically related map features (features), called a featureset, which are pictorial representations of things that are location-dependent, have a geographic position and/or have a geographically-defined or geometrical-defined shape as one aspect. The rendering styles 113, or rendering directives, comprise presentation directives that dictate how features are rendered. The layer scripts 114 and the viewer scripts 120 are behavioral or logic elements and are invoked, for example, in response to events initiated by a user and by changes in data of the features. Layer scripts 114 can be embedded in map layers 111 or can be loaded and executed independently of layer layers 111. Layer scripts 114 can call spatial and temporal operators in the library 140. Layer scripts 114 are distinct from the spatial data 112 and the rendering styles 113 within the map layer 111. That is, the layer scripts 114 are distinct elements, not part of the spatial data 112 or rendering styles 113, but may be operative on the spatial data 112 and/or the rendering styles 113.

Behavioral elements (e.g., layer scripts) may be, for example, software scripts that are configured to be interpreted, compiled, and/or executed when a user views the composite spatial representation. The layer scripts, for example, may be written, modified or edited (i.e., formed) by the user, and/or obtained from a remote source. The user may be, for example, the viewer of the composite spatial representation.

The map layer 111 may also comprise text that labels or describes the features, unique identifiers for the features, attributes (metadata) associated with the features, and event handler declarations associating the layer scripts 114 with events concerning the features.

As an example, map layers 111 are represented, when stored or transmitted, as XML documents. The specific XML language used in a particular embodiment is a map feature language (MFL), but other representations fulfilling the requirements above may also be used. Examples include keyhole markup language (KML) and GeoRSS (geographical resource description framework site summary and geographical really simple syndications).

Individual libraries within the library 140 include a layer-access library, an operator library, a GUI library and an application installed library. The storage device 103 is coupled to the map viewer 101 and may provide viewer scripts 120, rendering styles and layer scripts.

FIG. 1 also illustrates source applications 105 and map applications 102. The map applications 102 are instantiations of the map viewer 101. The map applications 102 are typically initiated, for example, by a remotely located first computing device coupled to a second computing device providing the map viewer. The first and second computing devices are coupled over a network 104, for example, the Internet or Web. The application manager 180 is coupled to the source applications 105 over the network 104 and manages the procurement and/or execution of the source applications 105.

The source applications 105 are coupled to the map viewer 101 over the network 104. The source applications 105 provide source maps to the map viewer 101. The source maps comprise source spatial data, source rendering styles and/or source layer scripts. The source spatial data and/or the source rendering styles make up, at least in part, source spatial representations. The spatial data 112, rendering styles 113 and layer scripts 114, for example, are at least partially generated from the source spatial data, source rendering styles and source layer scripts, respectively. However, spatial data 112, rendering styles 113 and layer scripts 114 may also include additional data, styles, scripts and components. The map layer 111 may also comprise a refresh attribute specifying a period of time after which the source maps should be reloaded. With appropriate security-related restrictions, layer scripts 114 can access data in source applications 105 and other applications. The layer scripts 114 and the viewer scripts 120 are separate and distinct from the source spatial representations and any spatial representation produced by the map viewer. The layer scripts 114 and the viewer scripts 120 provides interaction with or operate on the source spatial representations and/or with the spatial representation produced by the map viewer.

Figure 2:
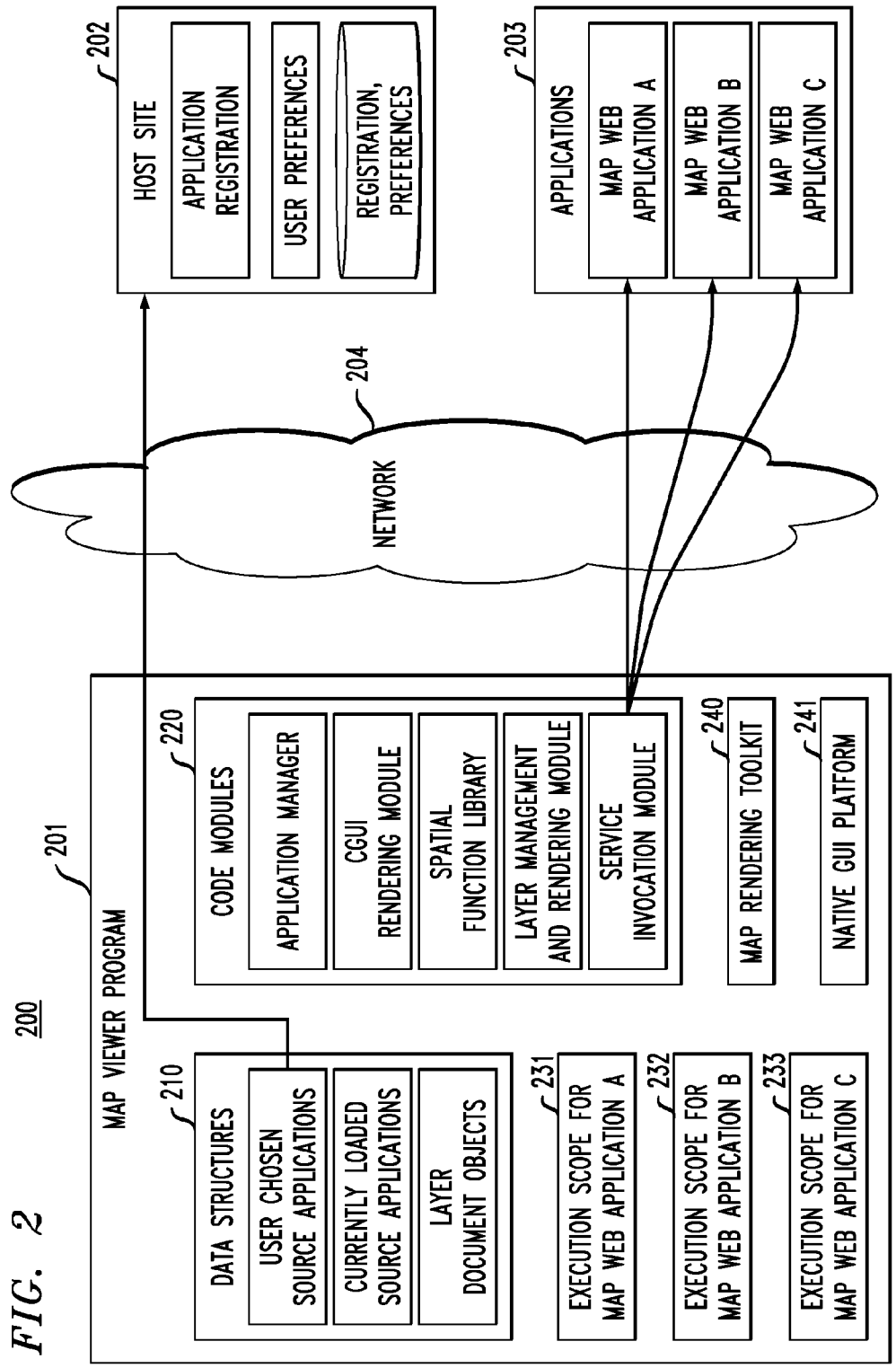
FIG. 2 illustrates an exemplary system of a map viewer program with associated host site and source applications, according to an exemplary embodiment of the invention.

FIG. 2 illustrates an exemplary system 200 of a map viewer program with associated host site and applications, according to an embodiment of the invention. The exemplary system 200 comprises the map viewer program 201, a host site 202, and applications A, B and C 203. The host site 202 comprises, for example, a host Web site. The host site 202 manages application registration and user preferences. The host site 202 is coupled to the map viewer program 201 by a network 204. The applications 203 are coupled to the map viewer program 201 by the network 204. The network 204 comprises, for example, the Internet.

The map viewer program 201 comprises data structures 210, execution scopes for map Web applications A, B and C 231, 232 and 233, respectively, code modules 220, a map rendering toolkit 240, and a native GUI platform 241. The code modules 220 include, for example, an applications manager, a CGUI rendering module, a spatial function library, a layer management and rendering module and a service invocation module. The service invocation module couples to and provides the applications 203. The data structures 210 include, for example, user chosen applications, currently loaded applications and layer document objects. The user chosen applications may be provided to and stored on the host site, within the user preference area.

Consider an event model of an embodiment of the invention. In the typical case, scripts contained in documents consist of declarations. Script execution is therefore driven by the occurrence of events, either those generated by the user through interactions with the map layers or CGUIs, or those generated by the viewer itself, such as onload or onchange events. Events are associated with a CGUI or map layer element. Event handlers are, for example, scripts declared on elements through XML attributes, which are executed when events are triggered. In addition, listener functions can be associated with elements by calling addListener methods in the map layer or CGUI document object model (DOM) application programming interfaces (APIs).

FIG. 3 is a map layer event table (incorporated by reference herein into the specification) listing exemplary events or event types that can be generated on map layer elements, according to an embodiment of the invention. Event data includes the feature or featureset object the event concerns.

Consider spatial functions of an embodiment of the invention. An embodiment provides a library of functions that perform various operations on spatial data, which can be invoked from map layer or CGUI document scripts (behavioral elements).

FIG. 4 shows a spatial functions table (incorporated by reference herein into the specification) listing functions that are substantially spatial in nature, i.e., concerned only with geometries, according to an embodiment of the invention.

FIG. 5 shows a spatio-temporal table (incorporated by reference herein into the specification) listing functions that take into account the change in geometrical relationships over time, according to an embodiment of the invention. These functions are termed spatio-temporal functions.

The functions listed in FIGS. 4 and 5 are representative, not exhaustive. In FIGS. 4 and 5, "F" and "FS" refer to feature and featureset objects, respectively. The spatio-temporal functions listed in FIG. 5 are stateful, that is, the spatio-temporal functions maintain data used in prior invocations of the function, and the spatio-temporal functions must be instantiated before use.

Consider interactive support of an embodiment of the invention. In addition to enabling applications to receive-click and mouse-over events on its own map layer features, the embodiment enables users to invoke application functions on any feature or featureset on the map or on map locations. The viewer provides means for the user to select a feature, featureset, or location, and then choose from a menu of services provided by the applications the user has available to them.

Service names and implementations (e.g., uniform resource locators or JavaScript function names) of an application are included in registration information of the application. In addition, for each service there is an indication of whether the application must be loaded for the service to be active, or whether the service is always available. When a user clicks on a feature or location, the viewer builds the service menu dynamically by adding the services of loaded applications, then adding the services that have been declared to be always available.

FIG. 6 illustrates a method 600 of generating a composite spatial representation in accordance with an exemplary embodiment of the invention. The composite spatial representation may, for example, be used by or in a spatially oriented application. A software program, for example, executes the method 600 and generates the composite spatial representation. The composite spatial representation is provided by, for example, a provider, which may be the entity that performs at least the first step 601 and the second step 602 of the method 600. The provider may additionally perform the third through tenth steps 603-610 of the method 600. For example, the provider comprises the map viewer 101.

The first step 601 comprises obtaining a plurality of source spatial representations and, optionally, source spatial representation GUI controls from a plurality of source applications. For example, the source spatial representations are maps comprising geographic information, location-dependent or geometric dependent information. The plurality of source applications are obtained, for example, from a plurality of data feeds comprise a plurality of static dynamic Web data feeds obtained over an Internet, for example, RSS data feeds. RSS refers to any of the following: rich site summary (RSS 0.91), really simple syndication (RSS 2.0), and resource description framework site summary (RSS 0.9 and 1.0). Alternately, the plurality of source applications may be obtained locally. Source applications typically represent a source GUI as one or more spatial-content source map layers plus zero or more source CGUIs associated with the source map layers. Source map layers are transmitted from source applications as source documents that contain source spatial features, source specifications for rendering the source spatial features (source styles), and executable source scripts (logic elements). FIG. 7 illustrates a second method, to be described below, for obtaining the plurality of source spatial representations and source spatial representation user graphical interface controls, according to an embodiment of the invention.

The second step 602 comprises forming a composite spatial representation by combining the plurality of source spatial representations. The source GUIs of multiple source applications are rendered simultaneously by overlaying the spatial content source map layers on each other to form the composite spatial representation. The composite spatial representation comprises spatial features and specifications for rendering the spatial features. For example, the composite spatial representation is a map comprising geographic information or location-dependent information.

The third step 603 comprises forming a composite spatial representation GUI control. The composite spatial representation GUI control is formed, at least in part, from parts of, or from all of, the source spatial representation GUI controls. Additionally, other components may be added to form the composite spatial representation GUI control. The composite spatial representation GUI control comprises, for example, a CGUI.

The fourth step 604 comprises forming an interactive composite spatial representation by combining the composite spatial representation and the composite spatial representation GUI control. The interactive composite spatial representation comprises, for example an interactive composite spatial representation GUI.

The fifth step 605 comprises providing, for example, by the provider, a first downstream service with at least part of the interactive composite spatial representation (e.g., the composite spatial representation). The interactive composite spatial representation may include spatial bounds and a scale of a display (ratio of real-world units to units of the display). Downstream services may request to be updated whenever context of the interactive composite spatial representation changes. The provider provides means for transmitting the at least part of the interactive composite spatial representation. For example, the at least part of the interactive composite spatial representation application is provided to the downstream service or services over the Internet or other network. The services may perform arbitrary actions including storage or transmission to other additional services or clients, thus facilitating user-to-user collaboration. For example, the interactive composite spatial representation may comprise map layers, map layer elements, or map layer events.

The sixth step 606 comprises obtaining an updated plurality of source spatial representations comprising updates on at least one source spatial representation. In this case, the plurality of data feeds comprises at least one dynamic feed which periodically provides the at least one updated source spatial representation.

The seventh step 607 comprises forming an updated interactive composite spatial representation by combining the updated plurality of source spatial representations. The source GUIs of updated multiple source applications, comprising the updated plurality of source spatial representations, are rendered simultaneously by overlaying the updated spatial content source map layers on each other to form the updated composite spatial representation. The updated interactive composite spatial representation comprises, for example, an updated interactive composite spatial representation GUI.

The eighth step 608 comprises providing the first downstream service with at least part of the updated interactive composite spatial representation. The updated interactive composite spatial representation may include spatial bounds and a scale of a display (ratio of real-world units to units of the display). Downstream services may request to be further updated whenever context of the updated interactive composite spatial representation changes. The provider provides means for transmitting the at least part of the updated interactive composite spatial representation. For example, the at least part of the updated interactive composite spatial representation is provided to services over the Internet or other network. The services may perform arbitrary actions including storage or transmission to other additional services or clients, thus facilitating user-to-user collaboration. For example, the updated interactive composite spatial representation may comprise map layers, map layer elements, or map layer events.

The ninth step 609 comprises providing and executing functions on the source spatial representation, the composite spatial representation, and/or the interactive composite spatial representation.

The tenth step 610 comprises defining a set of event types or functions. The functions are behavioral elements and comprise, for example, the layer scripts 114, the viewer scripts 120, logic elements, and scripts whose executions are triggered by events of the event types, user interactions or changes in data of map features. Scripts are typically software scripts. The functions provide interactions with or operate on the source spatial representation, the composite spatial representation, and/or the interactive composite spatial representation.

The functions comprise, for example, software to operate on the source spatial representation, the composite spatial representation, and/or the interactive composite spatial representation. The interaction with the source spatial representation, the composite spatial representation, and/or the interactive composite spatial representation provided by the functions comprises computations, user interactions and/or event-driven interactions. The functions operate on structure, content, decoration, a declarative element, a spatial feature or a decoration of the source spatial representation, the composite spatial representation, and/or the interactive composite spatial representation. The functions are adapted for execution by a spatially oriented application comprising the composite spatial representation or a downstream service receiving the composite spatial representation. Functions are separate from the source spatial representation, the composite spatial representation, and/or the interactive composite spatial representation.

The event types are defined by, for example, the provider. Examples of event types and event include user interaction events, a function (behavioral element) generated event, map layer update events, and script-generated events, as well as those related to the event types listed in FIG. 3. For example, the map layer update events include an update in the composite spatial representation and an update in one or more of the plurality of source spatial representations. Examples of functions are listed in FIGS. 4 and 5 and include spatial, temporal and statistical functions. For example, the provider is able to execute scripts associated with a map layer, or scripts that access multiple map layers, and provides a library of operators that implement functions over the data in the map layers. For example, the map layers comprise one or more of the map layers 111. For example, the library of operators comprises the operator library within library 140. Scripts may provide functions to other scripts. Binding between scripts and the provider is, for example, dynamic. In some embodiments, a function is provided to the downstream service or the user of the downstream service. In these embodiments, the downstream service executes the function.

Some embodiments also provide a library of sub-functions adapted for execution by the function. The library comprises, for example, spatial functions, temporal functions, spatiotemporal functions and/or statistical functions.

The eleventh step 611 comprises modifying at least part of the interactive composite spatial representation by the downstream service to form a modified interactive composite spatial representation, and providing the modified interactive composite spatial representation to a second downstream service. The eleventh step 611 is performed by, for example, a service that obtains spatial representations from the provider. Examples of services are: social networks or services; services providing collaboration; geographic information systems, services or providers; and emergency response systems, services or providers.

The twelfth step 612 is to display the interactive composite spatial representation or the updated interactive composite spatial representation. Displaying is done by a spatially oriented application comprising the composite spatial representation or a downstream service, typically, on a display of a user.

The method 600, the sixth step 605 and the eighth step 608 provide the interactive composite spatial representation and the updated interactive composite spatial representation, respectively. In other exemplary embodiments, the composite spatial representation and/or the updated composite spatial representation are provided.

It is to be understood that the functions of the provider can be distributed between a user client (e.g., a computing device of the user) and a server-side processing element (e.g., a server or other computing device of the provider). For example, the viewer scripts 120 (FIG. 1) may execute on a server of the provider on behalf of a particular user.

FIG. 7 illustrates an exemplary method for obtaining a plurality of source spatial representations and source spatial representation user graphical interface control, and for executing applications comprising the plurality of source spatial representations, according to an embodiment of the invention. An embodiment of an application comprises two documents, each with associated scripts (behavioral elements). One document is the CGUI document representing the CGUI, consisting of user interface (UI) elements such as forms, lists, tables, buttons, and checkboxes. The other document is a map layer document corresponding to the map layer(s) of the application. These documents are instantiated in the viewer as follows.

The first step 701 comprises a user clicking on, or otherwise indicating, a visual UI element, provided by a viewer, representing an application and specifying a document (specified document) of the application, either the CGUI document or the map layer document. For example, the UI element comprises an icon or a menu choice.

The second step 702 comprises the viewer, in response to the first step 701, creating an execution environment for the application. For example, the viewer comprises a map viewer. In one Web browser based embodiment, the execution environment is provided by an HTML iframe tag created within the viewer window.

The third step 703 comprises the viewer loading the specified document, indicated by the UI element, into the execution environment. If the specified document is the CGUI document, the CGUI document is rendered and made visible to the user. If the specified document is the map layer document, the map layer document is rendered on top of a provided map. Document rendering includes the processing of any scripts, except event handlers, contained in the document.

On handheld devices, the screen may be too small for the map and CGUIs of the application to be rendered in the same visual plane. Covering the map with the CGUI removes the user from the spatial context. Therefore, embodiments for handheld devices may, for example, render the CGUI semi-transparently, using enough opacity to maintain usability, but keeping the map visible underneath and thus retain the spatial context for the user.

The fourth step 704 comprises executing a first onload event handler and loading a corresponding document, that is, the document corresponding to the specified document. If the specified document is a CGUI document, the corresponding document is, for example, a corresponding map layer document, and the first onload event handler loads the corresponding map layer document. If the specified document is a map layer document, the corresponding document is, for example, a corresponding CGUI document, and the first onload event handler loads the corresponding CGUI document. Loading actions are performed, for example, through loadLayer or loadApp library functions provided by the viewer.

The fifth step 705 is optional and comprises executing a second onload event handler and loading a secondary document. If callback functions are provided as arguments to the loadLayer or loadApp library functions, these are invoked at this time.

An example embodiment is a composite spatial representation, or a spatially oriented application comprising the composite spatial representation, that provides locations of emergency vehicles obtained from a first source spatial representation. The composite spatial representation is periodically updated to update the locations of the emergency vehicles. Other spatial information from a second and third source spatial representation may also be obtained and comprised within the composite spatial representation. For example, a spatially oriented application comprising the composite spatial representation also obtains traffic information from the second source spatial information, and also obtains the location of emergency incidents form the third source spatial representation. Behavioral elements (scripts) function to compute the best available emergency vehicle to respond to the emergency incident, and the optimum route for the emergency vehicle given the location of the emergency vehicle, the location of the emergency incident, and the traffic conditions.

In this example, the first, second and third source spatial representations are a plurality of source spatial representations from a plurality of source applications. The composite spatial representation is formed by combining the plurality of source spatial representations. The composite spatial representation is operative to interact with the behavioral elements. The behavioral elements are separate from the composite spatial representation in that, for example, the composite spatial representation, as well as the source spatial representations, comprises information independent of the behavioral elements. The spatial representations may be, for example, useful in and of themselves without the behavioral elements, for example, as the source spatial representations are in the source applications. The behavioral elements may not be necessary for use or display of the spatial representations. The behavioral elements, however, may add value or usefulness to the spatial representations. In this example, the behavioral elements add value and useful functions by determining the best available emergency vehicle to respond to the emergency incident, and the optimum route for the emergency vehicle given the location of the emergency vehicle, the location of the emergency incident, and the traffic conditions. The useful functions may be dependent upon the combination or overlay of the source spatial representations and operation on the spatial representations (i.e., source and/or composite spatial representations) by the behavioral elements.

Another example of an embodiment of the invention is a display of stars and planets, from a first source map layer of a first source application, combined with a display of asteroids from a second source map layer of a second source application, and position-dependent information on orbiting space junk, from a source spatial representation (e.g., a data-stream) of a third source application, to generate a composite display (e.g., an electronic map) or composite data-stream showing or comprising the positions of asteroids and space junk in relationship to the earth, other planets and stars. The composite display or composite data-stream is used as input to an earth based warning system for earth impacts by outer space objects.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIGS. 6 and 7, which are flow diagram or flowchart of the methods 600 and 700, respectively, the flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Accordingly, techniques of the invention, for example as depicted in FIGS. 1-7, can also include, as described herein, providing a system, wherein the system includes distinct modules (e.g., software modules). By way of example only, the modules may include: a source spacial representation procurement module configured to obtain a plurality of source spatial representations from a plurality of source applications; a composite spatial representation formation module configured to form a composite spatial representation by combining the plurality of source spatial representations; a composite spatial representation providing module configured to provide the composite spatial representation; and a behavioral element providing module configured to provide a behavioral element that is separate from the plurality of source spatial representations and the composite spatial representation, wherein the behavioral element provides interaction with at least one of a group of spatial representations comprising the plurality of source spatial representations and the composite spatial representation. The modules may be adapted, for example, to perform the steps of methods 600 and 700 illustrated in FIGS. 6 and 7, respectively.

One or more embodiments can make use of software running on a general purpose computer or workstation. With reference to FIG. 8, such an implementation employs, for example, a processor 802, a memory 804, and an input/output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, keyboard or mouse), and one or more mechanisms for providing results associated with the processing unit (for example, display or printer). The processor 802, memory 804, and input/output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

A data processing system suitable for storing and/or executing program code can include at least one processor 802 coupled directly or indirectly to memory elements 804 through a system bus 810. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboard 808, display 806, pointing device, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 812 as shown in FIG. 8) running a server program. It will be understood that such a physical server may or may not include a display and keyboard.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for generating a composite spatial representation, the method comprising:
    obtaining a plurality of source spatial representations from a plurality of source applications;
    forming a composite spatial representation by combining the plurality of source spatial representations;
    forming a first user interface control layer that is configured to control the composite spatial representation;
    combining the first user interface control layer with the composite spatial representation to generate an interactive composite spatial representation that is configured to be user controlled using the first user interface control layer; and
    dynamically binding one or more behavioral elements with the interactive composite spatial representation based on a current state of the interactive composite spatial representation,
    wherein the behavioral elements comprise software scripts and functions that implement interactive and computational behaviors, which are triggered in response to user interaction with the first user interface control layer of the interactive composite spatial representation,
    wherein the one or more behavioral elements are separate and independent from the set of objects that are used to instantiate the structure and content and decorative presentation of the composite spatial representation and the first user interface control layer of the interactive composite spatial representation such that the composite spatial representation and the first user interface control layer are complete and independently executable without executing the one or more behavioral elements,
    wherein the one or more behavioral elements interact with said set of objects to cause a change in behavior, presentation, execution and process flow of said interactive composite spatial presentation, and
    wherein the one or more behavioral elements are configured to execute spatial functions, temporal functions, spatio-temporal functions and statistical functions, depending on a current state of the interactive composite spatial representation,
    wherein the obtaining, forming, combining, and dynamically binding steps are executed on a computing system comprising a processor and a memory, and wherein one or more computer program instructions for implementing the obtaining, forming and dynamically binding steps are obtained from the memory and executed by the processor device.

2. The method of claim 1, wherein at least one behavioral element comprises one or more software scripts configured to be at least one of compiled, and executed in response to a user viewing the composite spatial representation.

3. The method of claim 1, wherein at least one behavioral element comprises one or more software scripts that are at least one of formed by a user, and obtained from a remote source, and wherein the method is operative for the user to view the composite spatial representation.

4. The method of claim 1, wherein at least one behavioral element comprises software code operative on at least one of: the plurality of source spatial representations, the composite spatial representation, and the first user interface control layer.

5. The method of claim 1, wherein at least one behavioral element interacts with the composite spatial representation by at least one of computation, user interaction and event-driven interaction.

6. The method of claim 1, wherein at least one behavioral element operates on at least one of structure, content, decoration, a declarative element, a spatial feature and a decoration of at least one of the plurality of source spatial representations and the composite spatial representation.

7. The method of claim 1, wherein at least one behavioral element is configured for execution by at least one of: a spatially oriented application comprising the composite spatial representation, and a downstream service receiving the composite spatial representation.

8. The method of claim 1, wherein the plurality of source applications are obtained from at least one of a plurality of data feeds, and a plurality of data feeds comprising a plurality of dynamic Web data feeds obtained over the Internet.

9. The method of claim 1, wherein a library of functions are configured for execution by the one or more behavioral elements, wherein the library comprises at least one of a spatial function, a temporal function, a spatio-temporal function and a statistical function.

10. The method of claim 1, wherein the composite spatial representation is at least one of displayed, and operative for user interactions.

11. The method of claim 1, further comprising obtaining a second user interface control layer from at least one of the plurality of source applications, wherein the first user interface control layer comprises the second user interface control layer.

12. The method of claim 1, wherein the first user interface control layer comprises a graphical user interface.

13. The method of claim 1, wherein the composite spatial representation comprises spatial features and specifications for rendering the spatial features.

14. The method of claim 1, wherein the composite spatial representation is configured for at least one of provision to a downstream service, and being updating and re-provisioned to the downstream service.

15. The method of claim 1, wherein an event causes the execution of at least one behavioral element, wherein the event is at least one of a user interaction, an update in at least one of the plurality of source spatial representations and the composite spatial representation, and a behavioral element-generated event.

16. The method of claim 1, wherein a spatially oriented application comprising the composite spatial representation is configured for a user to indicate a source application comprising at least one of the plurality of source spatial representations, and wherein the spatially oriented application is configured for loading and executing the source application.

17. The method of claim 1, wherein at least one of the plurality of source spatial representations comprises at least one of geographic information and location-dependent information, and wherein the composite spatial representation comprises at least one of the geographic information and the location-dependent information.

18. The method of claim 1, wherein a spatially oriented application comprising the composite spatial representation provides a location, obtained from a first spatial representation of the plurality of source spatial representations, of at least one emergency vehicle, wherein the spatially oriented application is configured for updating the location, and wherein the spatially oriented application provides spatial information from a second spatial representation of the plurality of source spatial representations.

19. Apparatus for generating a composite spatial representation, the apparatus comprising:
a memory; and
a processor coupled to the memory and operative to:
obtain a plurality of source spatial representations from a plurality of source applications;
form the composite spatial representation by combining the plurality of source spatial representations;
form a first user interface control layer that is configured to control the composite spatial representation;
combine the first user interface control layer with the composite spatial representation to generate an interactive composite spatial representation that is configured to be user controlled using the first user interface control layer; and
dynamically bind one or more behavioral elements with the interactive composite spatial representation based on a current state of the interactive composite spatial representation,
wherein the behavioral elements comprise software scripts and functions that implement interactive and computational behaviors, which are triggered in response to user interaction with the first user interface control layer of the interactive composite spatial representation,
wherein the one or more behavioral elements are separate and independent from the set of objects that are used to instantiate the structure and content and decorative presentation of the composite spatial representation and the first user interface control layer of the interactive composite spatial representation such that the composite spatial representation and the first user interface control layer are complete and independently executable without executing the one or more behavioral elements,
wherein the one or more behavioral elements interact with said set of objects to cause a change in behavior, presentation, execution and process flow of said interactive composite spatial presentation, and
wherein the one or more behavioral elements are configured to execute spatial functions, temporal functions, spatio-temporal functions and statistical functions, depending on a current state of the interactive composite spatial representation.

20. A computer program product for generating a composite spatial representation, the computer program product comprising a non-transitory computer readable storage medium having computer readable program code embodied therewith, which when executed by a computer, causes the computer to:
obtain a plurality of source spatial representations from a plurality of source applications;
form the composite spatial representation by combining the plurality of source spatial representations;
form a first user interface control layer that is confirmed to control the composite spatial representation;
combine the first user interface control layer with the composite spatial representation to generate an interactive composite spatial representation that is configured to be user controlled using the first user interface control layer; and
dynamically bind one or more behavioral elements with the interactive composite spatial representation based on a current state of the interactive composite spatial representation,
wherein the behavioral elements comprise software scripts and functions that implement interactive and computational behaviors, which are triggered in response to user interaction with the first user interface control layer of the interactive composite spatial representation,
wherein the one or more behavioral elements are separate and independent from the set of objects that are used to instantiate the structure and content and decorative presentation of the composite spatial representation and the first user interface control layer of the interactive composite spatial representation such that the composite spatial representation and the first user interface control layer are complete and independently executable without executing the one or more behavioral elements,
wherein the one or more behavioral elements interact with said set of objects to cause a change in behavior, presentation, execution and process flow of said interactive composite spatial presentation, and
wherein the one or more behavioral elements are configured to execute spatial functions, temporal functions, spatio-temporal functions and statistical functions, depending on a current state of the interactive composite spatial representation.

* * * * *